United States Patent [19]
Crabb

[11] Patent Number: 6,017,288
[45] Date of Patent: Jan. 25, 2000

[54] FINAL DRIVE FOR A BELTED MACHINE

[75] Inventor: Elmer R. Crabb, Granbury, Tex.

[73] Assignee: Caterpillar Inc., Peoria, Ill.

[21] Appl. No.: 09/189,647

[22] Filed: Nov. 10, 1998

[51] Int. Cl.[7] .................................................... F16H 1/46
[52] U.S. Cl. ............................................................ 475/332
[58] Field of Search ................................. 180/9.64, 9.62; 475/331, 332

[56] References Cited

U.S. PATENT DOCUMENTS

| | | | |
|---|---|---|---|
| 5,316,381 | 5/1994 | Isaacson et al. | 305/10 |
| 5,340,205 | 8/1994 | Nagorcka | 305/22 |

Primary Examiner—Dirk Wright
Attorney, Agent, or Firm—Haverstock, Garrett & Roberts

[57] ABSTRACT

A final drive for a belted machine including a rotatable drive member located between the hubs of a drive wheel assembly of the machine for connection in driven communication with a power source and a pair of planetary gear sets located between the hubs, each planetary gear set including a member adapted for fixed connection to a frame of the machine, a rotatable input member connected in driven communication with the rotatable drive member, and a rotatable output member connected in driven communication with the rotatable input member and adapted for connection in driving communication with one of the hubs. The present final drive additionally has utility for use on tracked and wheeled machines used in a wide variety of industrial fields, including, but not limited to, forestry, agriculture, construction, mining, and excavating.

5 Claims, 2 Drawing Sheets

FINAL DRIVE FOR A BELTED MACHINE

TECHNICAL FIELD

This invention relates generally to final drives, and more particularly, to a final drive for a belted machine utilizing a pair of planetary gear sets each having a rotatable input member adapted for connection in driven communication with a drive member driven by a power source, and a rotatable output member in driven communication with the input member adapted for connection in driving communication with a drive wheel of a bifurcated drive wheel assembly, all disposed between the inner and outer hubs of the drive wheel assembly.

BACKGROUND ART

Currently, final drives for belted machines typically include a final drive sprocket mounted between the hubs of a bifurcated drive wheel assembly, or a final drive sprocket, output gear of a planetary gear set, or the like, mounted externally on one side of a drive wheel hub, for connection in driven communication with the machine power source. A resultant shortcoming of the known final drives is that no further gear reduction capability is present between the drive wheel assembly and the drive sprocket, output gear or other drive member. An additional shortcoming of known final drives of the latter type is the observation that the structures supporting the drives are subject to high torsional loading.

Accordingly, the present invention is directed to overcoming one or more of the problems as set forth above.

DISCLOSURE OF THE INVENTION

In one aspect of the present invention, a final drive for a belted machine is disclosed, which final drive includes a rotatable drive member such as a sprocket or the like located between the hubs of a bifurcated drive wheel assembly for connection in driven communication with a power source, and a pair of planetary gear sets also located between the hubs, each planetary gear set including a member adapted for fixed connection to a frame of the machine, a rotatable input member connected in driven communication with the rotatable drive member, and a rotatable output member connected in driven communication with the rotatable input member and adapted for connection in driving communication with one of the hubs.

BEST MODE FOR CARRYING OUT THE INVENTION

Figure 1:
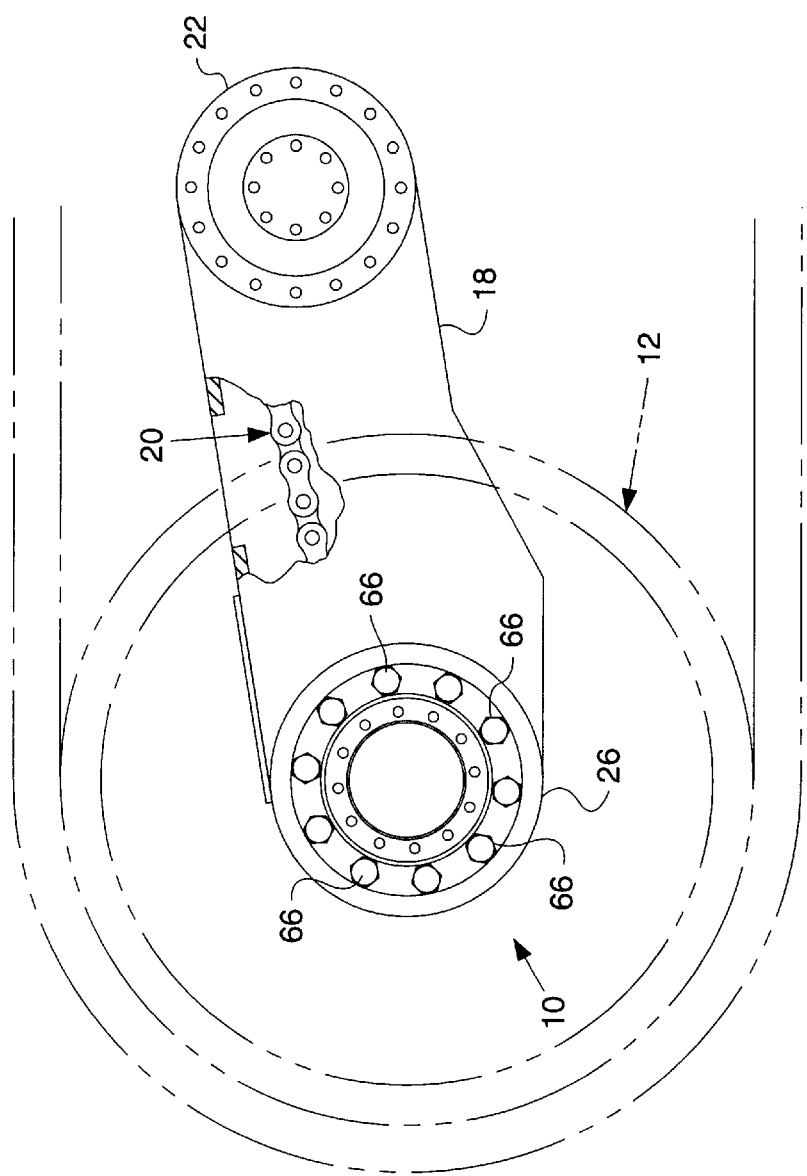
FIG. 1 is a fragmentary side view of a final drive according to the present invention, shown in association with pertinent portions of a belted machine (in phantom)

Referring to the drawings wherein like numerals refer to like parts, FIG. 1 shows a side view of a final drive 10 constructed and operable according to the teachings of the present invention. Final drive 10 is shown connected in driving communication with an outer drive wheel 12 partially encircled by a drive belt 14 (both in phantom) of a typical belted machine 16. Here, it should be understood that it is contemplated that belted machine 16 be representative of a wide variety of both belted and tracked machines utilized in a wide variety of industrial fields, including, but not limited to, forestry, agriculture, construction, mining, and excavating. Final drive 10, outer drive wheel 12 and drive belt 14 are mounted to a forwardly to rearwardly extending undercarriage frame 18 of machine 16, an identical inner drive wheel (not shown) being located directly behind drive wheel 12 adjacent an opposite side of frame 18, and a generally identical second final drive, drive belt and frame (not shown) being located on an opposite side of machine 16, directly behind the elements shown. Power is transmitted from a power source such as a drive line in communication with an engine (not shown) of machine 16 to final drive 10, using a double chain 20 located within undercarriage frame 18 and which encircles a bifurcated input sprocket (not shown) located within an undercarriage hub 22 of machine 16, and a bifurcated final drive sprocket 24 (FIG. 2) located behind an outer hub 26 of outer drive wheel 12, as explained next.

Figure 2:
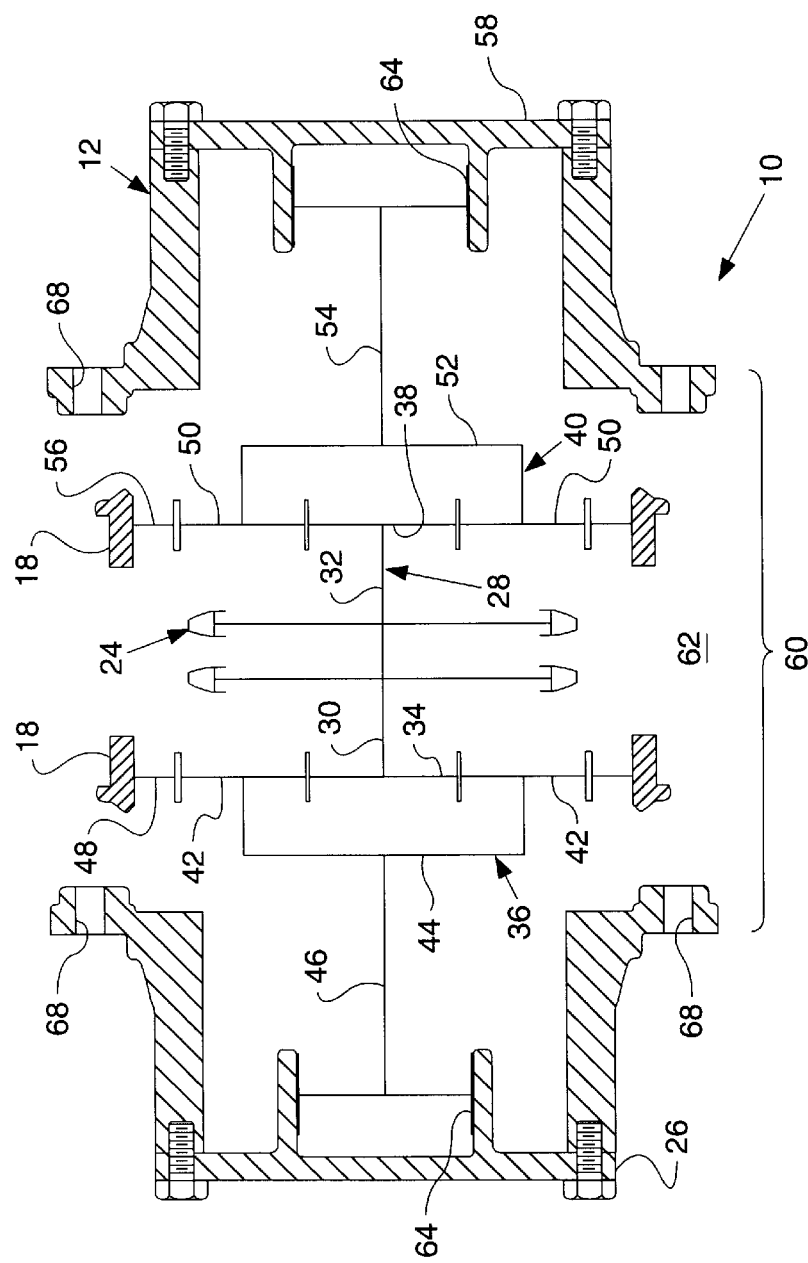
FIG. 2 is a diagrammatic representation of the final drive of FIG. 1, showing inner and outer drive wheel hubs and portions of an undercarriage frame of the machine in cross-section.

Referring also to FIG. 2, final drive sprocket 24 is mounted to an input shaft 28 of final drive 10 for rotation therewith at a location intermediate a first end 30 and an opposite second end 32 thereof. A sun gear 34 of a first planetary gear set 36 is mounted to first end 30 of input shaft 28 for rotation therewith, and a sun gear 38 of a second planetary gear set 40 is mounted to second end 32 of input shaft 28 for rotation therewith. First planetary gear set 36 includes a plurality of planet gears 42 enmeshed in driven communication with sun gear 34 at spaced locations therearound. Planetary gear set 36 includes a carrier 44 connected in supportive relation with planet gears 42, carrier 44 including an output shaft 46. Planetary gear set 36 further includes a ring gear 48 enmeshed with planet gears 42, ring gear 48 being fixedly connected to a portion of undercarriage frame 18 so as to be non-rotatable.

Second planetary gear set 40 is a mirror image of planetary gear set 36 and includes a plurality of planet gears 50 enmeshed in driven communication with sun gear 38; a carrier 52 rotatably supporting planet gears 50 and including an output shaft 54; and a ring gear 56 enmeshed with planet gears 50 and fixedly connected to undercarriage frame 18 so as to be non-rotatable.

Outer drive wheel 12 is part of a bifurcated drive wheel assembly 60 including outer hub 26 to which wheel 12 is mounted and an identically constructed but oppositely facing inner hub 58 to which the inner drive wheel (not shown) is mounted. Final drive 10 is located within a space 62 between inner hub 58 and outer hub 26. Output shaft 46 of planetary gear set 36 is connected in driving communication with outer hub 26, and output shaft 54 of planetary gear set 40 is connected in driving communication with inner hub 58, respectively, with conventional mating splined sections 64 on the respective members. The respective hubs 26 and 58 are mounted to outer drive wheel 12 and to the inner drive wheel with bolts 66 (FIG. 1) which pass through holes 68 in hubs 26 and 58 and threadedly engage outer drive wheel 12 and the inner drive wheel in the conventional manner.

In operation, final drive sprocket 24 is rotated by chain 20 to simultaneously rotate sun gears 34 and 38 of planetary gear sets 36 and 40. Since ring gears 48 and 56 of the planetary gear sets 36 and 40 are fixed and non-rotating members, power is transmitted to planet gears 42 and 50 to simultaneously rotate output shafts 46 and 54, thereby rotating drive wheel assembly 60. Operational advantages of final drive 10 include the ability to locate the final drive gear reduction within drive wheel assembly 60 between hubs 26 and 58. This enables undercarriage hub 22, the chain sprocket contained therein (not shown), chain 20, and the portion of undercarriage frame 18 containing chain 20 to be smaller and more economically constructed. Additionally, with reference to FIG. 2, because power is inputted centrally to drive wheel assembly 60 via final drive 10 and distributed evenly and simultaneously through outer hub 26 and inner hub 58 to the drive wheels, torsional loading problems resultant from power delivery into one side of the drive wheel assembly are avoided, which also enables undercarriage frame 18 to be less massive and more economically constructed.

INDUSTRIAL APPLICABILITY

The present final drive has utility for use in a wide variety of applications, including in belted machines, tracked machines, and wheeled machines, used in a wide variety of industrial fields, including, but not limited to, forestry, agriculture, construction, mining, and excavating.

Other aspects, objects and advantages of the present invention can be obtained from a study of the drawings, the disclosure and the appended claims.

I claim:

1. A final drive for a belted machine, comprising:

an inner drive wheel hub and an outer drive wheel hub;

a rotatable drive member located between the drive wheel hubs adapted for connection in driven communication with a power source; and a pair of planetary gear sets located between the drive wheel hubs, each planetary gear set including a member adapted for fixed connection to a frame of the machine, a rotatable input member connected in driven communication with the rotatable drive member, and a rotatable output member connected in driven communication with the rotatable input member and connected in driving communication with one of the drive wheel hubs.

2. The final drive, as set forth in claim 1, wherein the member adapted for fixed connection to the frame comprises a ring gear, the rotatable input member comprises a sun gear and the rotatable output member comprises a planet gear carrier.

3. The final drive, as set forth in claim 1, wherein the rotatable drive member is a sprocket adapted for connection in driven communication with a drive chain.

4. A final drive for a belted machine, comprising:

an inner drive wheel hub and an outer drive wheel hub;

a rotatable drive member located between the drive wheel hubs adapted for connection in driven communication with a power source; and a pair of planetary gear sets located between the drive wheel hubs, each of the planetary gear sets having a ring gear adapted for fixed connection to a frame of the machine, a sun gear connected in driven communication to the rotatable drive member, a plurality of planet gears enmeshed with the ring gear and the sun gear, and a planet gear carrier supporting the planet gears for rotation connected in driven communication with one of the final drive wheel hubs.

5. The final drive, as set forth in claim 4, wherein the drive member is a sprocket adapted for driven connection with a drive chain.

\* \* \* \* \*